United States Patent
Lampe-Jürgens et al.

(10) Patent No.: US 11,920,971 B2
(45) Date of Patent: Mar. 5, 2024

(54) GAS FLOWMETER HAVING INLINE CALIBRATING

(71) Applicant: Honeywell International Inc., Morris Plains, NJ (US)

(72) Inventors: Christian Lampe-Jürgens, Spelle (DE); Ralf Schröder gen. Berghegger, Glandorf (DE); Andreas Wuchrer, Georgsmarienhütte (DE); Norbert Flerlage, Löningen (DE); Tobias Meimberg, Osnabrück (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 488 days.

(21) Appl. No.: 16/993,939

(22) Filed: Aug. 14, 2020

(65) Prior Publication Data

US 2022/0049986 A1    Feb. 17, 2022

(51) Int. Cl.
  *G01F 25/10*   (2022.01)
  *G01F 1/66*    (2022.01)
  (Continued)

(52) U.S. Cl.
  CPC .............. *G01F 25/10* (2022.01); *G01F 1/662* (2013.01); *G01F 15/005* (2013.01); *G08B 21/12* (2013.01); *G08C 17/02* (2013.01)

(58) Field of Classification Search
  CPC ........ G01F 25/10; G01F 1/662; G01F 15/005; G08B 21/12; G08C 17/02
  (Continued)

(56) References Cited

U.S. PATENT DOCUMENTS

| 4,384,925 A | 5/1983 | Stetter et al. |
| 4,596,144 A | 6/1986 | Panton et al. |

(Continued)

FOREIGN PATENT DOCUMENTS

| CN | 104515560 A | 4/2015 |
| CN | 109358306 A | 2/2019 |

(Continued)

OTHER PUBLICATIONS

Extended European Search Report dated Jan. 10, 2022, issued in connection with corresponding EP Application No. 21189738.4 (10 pages total).

(Continued)

*Primary Examiner* — Robert R Raevis
(74) *Attorney, Agent, or Firm* — John Maldjian, Esq.; Stevens & Lee PC (57) ABSTRACT

A static gas flowmeter for sensing a flow of gas includes an outer housing, a flow tube coupled to an outlet or an inlet, ≥1 sensor positioned for sensing gas flowing through the flow tube, and a controller including a memory including a flow calibration and flow measurement algorithm coupled to a sensor receiving a sensing signal. An integrated gas valve is connected to the inlet or outlet and/or there is an additional external valve positioned outside the housing coupled to the inlet to provide the gas flowmeter at least two state operation. Using the valve(s), the flow calibration algorithm triggers a zero-flow condition, then obtains a measured gas flow, and from the measured gas flow a flow offset is determined. If the flow offset is outside a predetermined limit, in-line calibrating is performed by adding the flow offset reflected as a correction factor to the flow measurement algorithm.

20 Claims, 9 Drawing Sheets

(51) Int. Cl.
*G01F 15/00* (2006.01)
*G08B 21/12* (2006.01)
*G08C 17/02* (2006.01)

(58) Field of Classification Search
USPC .......................................................... 73/1.34
See application file for complete search history.

(56) References Cited

U.S. PATENT DOCUMENTS

| | | | |
|---|---|---|---|
| 5,649,986 | A | 7/1997 | Mueller |
| 5,969,263 | A | 10/1999 | Ligneul et al. |
| 6,766,276 | B1 | 7/2004 | Dury |
| 6,997,032 | B2 | 2/2006 | Mattar |
| 8,631,712 | B2 | 1/2014 | Zhu et al. |
| 8,955,392 | B2 | 2/2015 | Liu et al. |
| 9,671,269 | B2 | 6/2017 | Berger et al. |
| 9,797,765 | B2 | 10/2017 | Nagai et al. |
| 11,137,276 | B1 * | 10/2021 | Helfenstein ............. G01F 1/662 |
| 11,323,785 | B1 | 5/2022 | Lampe-Juergens |
| 2007/0017304 | A1 | 1/2007 | Kumpfmueller |
| 2007/0192046 | A1 | 8/2007 | Hairston et al. |
| 2008/0087169 | A1 | 4/2008 | Clark |
| 2009/0187356 | A1 | 7/2009 | Artiuch |
| 2012/0229295 | A1 | 9/2012 | Sharma et al. |
| 2013/0152527 | A1 | 6/2013 | Rother |
| 2013/0152528 | A1 | 6/2013 | Disson |
| 2015/0276433 | A1 | 10/2015 | Brahmajosyula et al. |
| 2016/0325218 | A1 | 11/2016 | Hasegawa |
| 2017/0175741 | A1 | 6/2017 | Nishikawa et al. |
| 2017/0254688 | A1 | 9/2017 | Patten et al. |
| 2017/0298597 | A1 | 10/2017 | Hammond et al. |
| 2019/0145804 | A1 | 5/2019 | Artiuch |
| 2020/0149944 | A1 | 5/2020 | Haag et al. |
| 2022/0049986 | A1 | 2/2022 | Lampe-Jürgens et al. |
| 2022/0146297 | A1 | 5/2022 | Flerlage et al. |
| 2022/0146298 | A1 | 5/2022 | Meimberg et al. |

FOREIGN PATENT DOCUMENTS

| | | |
|---|---|---|
| CN | 109598353 A | 4/2019 |
| CN | 110068789 A | 7/2019 |
| CN | 110927654 A | 3/2020 |
| DE | 19859854 A1 | 6/2000 |
| EP | 1064522 A1 | 1/2001 |
| JP | 2584935 B | 2/1997 |
| JP | 4024110 B | 12/2007 |
| JP | 5351742 B | 11/2013 |
| JP | 2014092467 A | 5/2014 |
| KR | 20180056003 A | 5/2018 |
| KR | 20180056003 A | 5/2018 |

OTHER PUBLICATIONS

U.S. Appl. No. 16/949,697, filed Nov. 11, 2020, Norbert Flerlage.
U.S. Appl. No. 16/949,706, filed Nov. 11, 2020, Tobias Meimberg.
U.S. Appl. No. 17/247,129, filed Dec. 1, 2020, Christian Lampe-Juergens.

* cited by examiner

GAS FLOWMETER HAVING INLINE CALIBRATING

FIELD

Disclosed embodiments relate to calibration of static gas flowmeters.

BACKGROUND

A gas flowmeter is a particular type of flowmeter, used to measure the volume of flowing gases, typically being fuel gases such as natural gas and liquefied petroleum gas. Gas flowmeters are commonly used at residential, commercial, and industrial buildings that consume fuel gas supplied by a gas utility. Gas flow is more difficult to measure as compared to liquid flow because measured gas volumes unlike liquids are highly affected by temperature and by pressure. Gas flowmeters measure a defined volume, regardless of the pressurized quantity or quality of the gas flowing through the flowmeter. Temperature, pressure, and heating value compensation must generally be made to measure actual amount and thus the economic value (for buying or selling) of the gas flowing through a gas flowmeter.

Several different designs of gas flowmeters are commonly used, depending on the volumetric flow rate of gas to be measured, the range of flows anticipated, the type of gas being measured, and other factors. Known types of gas flowmeters include diaphragm (or bellows) flowmeters, rotary flowmeters, turbine flowmeters, orifice flowmeters, thermal mass flowmeters, ultrasonic flowmeters, and *coriolis* flowmeters. Thermal mass flowmeters and ultrasonic flowmeters are both examples of static flowmeters, meaning they have no moving parts during their operation.

An ultrasonic flowmeter includes relatively inexpensive types available as clamp-on flowmeters, which can be used to measure the fluid flow flowing in essentially any diameter of pipe without the need for any intrusive modification. Alternatively, the ultrasonic flowmeter can be installed together with a pipe section that is inserted into a pipeline. Ultrasonic flowmeters calculate gas flow based on time-of-flight also known as transit time. Ultrasonic flowmeters generally utilize piezoelectric transducers comprising Lead Zirconate Titanate (PZT). Ultrasonic flowmeters can be programmed with the pipe size (area) and schedule, which can be used to calculate the gas flow and to measure the flow of almost any dry gas including natural gas, propane, nitrogen, compressed air, and steam.

A thermal mass flowmeter is known in the art to have first and second temperature sensors spaced apart from one another with a heating element in between. In operation, the temperature at the temperature sensors varies depending upon the mass flow of the fluid.

Gas flowmeters measure either volume flow or the mass flow. The volume flow (Q) is equal to the cross-sectional area of the pipe (A) in a volumetric flowmeter, and the velocity of the flowing fluid (v): $Q = A*v$. The mass flow can be expressed in a mass flowmeter as follows: $m = Q*\rho$ (where Q is the volumetric flow rate and $\rho$ is the fluid density). The mass flow rate is a key parameter in many cases, especially in combustion, chemical reactions, or in the buying and selling of gases, such as natural gas.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize conventional static gas flowmeters such as ultrasonic gas flowmeters or thermal mass gas flowmeters have the problem of an error shift in their flow measurement developing during their operating lifetime in the field (e.g., being installed on or within a pipeline sometimes alternatively referred to as being installed in the 'net'), and there is believed to be no known way for this error shift to be corrected while the gas flowmeter remains installed in the net. This error shift can result from wear out, as well as ageing and dust effects within the gas flowmeter. If some gas flowmeter(s) from a production batch of gas flowmeters are found to be running outside their established flow measurement accuracy limits, then the entire production batch of gas flowmeters may need to be removed from the net, to enable re-calibration to be generally performed in service shops, or replacement of the gas flowmeter(s). This recalibration can be an expensive process, and also many gas flowmeters will generally need to be taken off the net, including gas flowmeters which have not seen any significant flow measurement shift.

One disclosed embodiment comprises a static gas flowmeter (gas flowmeter) configured for being installed to sense the flow of a gas flowing in a pipe section of a gas pipeline, where the gas flowmeter includes an outer housing having an inlet and an outlet. A flow tube is coupled to the outlet or the inlet, and there is at least one flow sensor positioned for sensing gas flowing through the flow tube. A controller including an associated memory includes a flow calibration algorithm and a flow measurement algorithm is communicatively coupled to the sensor(s) for receiving a sensing signal from the sensor, and for controlling operation of the sensor. The gas flowmeter includes an integrated gas valve that is connected to the inlet or to the outlet and/or there is an additional external valve is positioned outside the housing coupled to the inlet, to provide at least two-state operation for the gas flowmeter.

Using the valve(s), the flow calibration algorithm is configured for creating a zero-flow condition through the gas flowmeter. During the zero-flow condition, the flow measurement algorithm generates a measured gas flow. From the measured gas flow, the flow calibration algorithm determines a flow offset. If the flow offset is determined to be outside a predetermined limit, a flow offset correction factor reflecting the flow offset is provided, which is used by the flow measurement algorithm to provide a corrected gas flow by reducing the flow offset for gas flow measurements.

A corrected flow rate output by the gas flowmeter after the in-line calibrating can be a measured flow rate of the gas multiplied by a constant slope correction factor, where the constant slope correction factor is generally determined in the production factory for the gas flowmeter, which is adjusted by the flow offset correction factor. If the in-line calibration is determined to not be successful, generally because one of the flow offset correction factor and the slope correction factor is determined to be too large relative to some predetermined maximum for these parameters, the gas flowmeter may need servicing or a replacement, so that an alarm can be sent by the gas flowmeter through RF communications in the case the flowmeter is a smart flowmeter having RF communication capability to a head end system, such as a gas company office.

BRIEF DESCRIPTION OF THE DRAWINGS

FIGS. 6A-C are plots showing the gas flow rate error for an ultrasonic gas flowmeter based on the gas flowmeter shown in FIG. 1A (in percentage flow error (y-axis) versus the gas flow rate, with the testing performed at ambient conditions.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As known in the art, algorithms such as disclosed in-line flow calibration algorithms may be implemented by hardware or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern shown as hardware including digital logic. Regarding software-based algorithm implementations, algorithm code stored in the associated memory can be implemented by a processor. Only one of the algorithm software and hardware including digital logic is needed.

Disclosed in-line flowmeter calibration enables gas flowmeters to be re-calibrated while in the net (or in the field), thus without removing the gas flowmeter(s) from the net. The flowmeters for disclosed in-line flowmeter calibration are generally configured with at least one valve to be able to be placed in a zero-flow condition, which enables correcting the offset of an ultrasonic flowmeter. This zero-flow condition can be generated by closing an integrated gas valve of the flowmeter, and/or by closing an external valve.

Figure 1A:
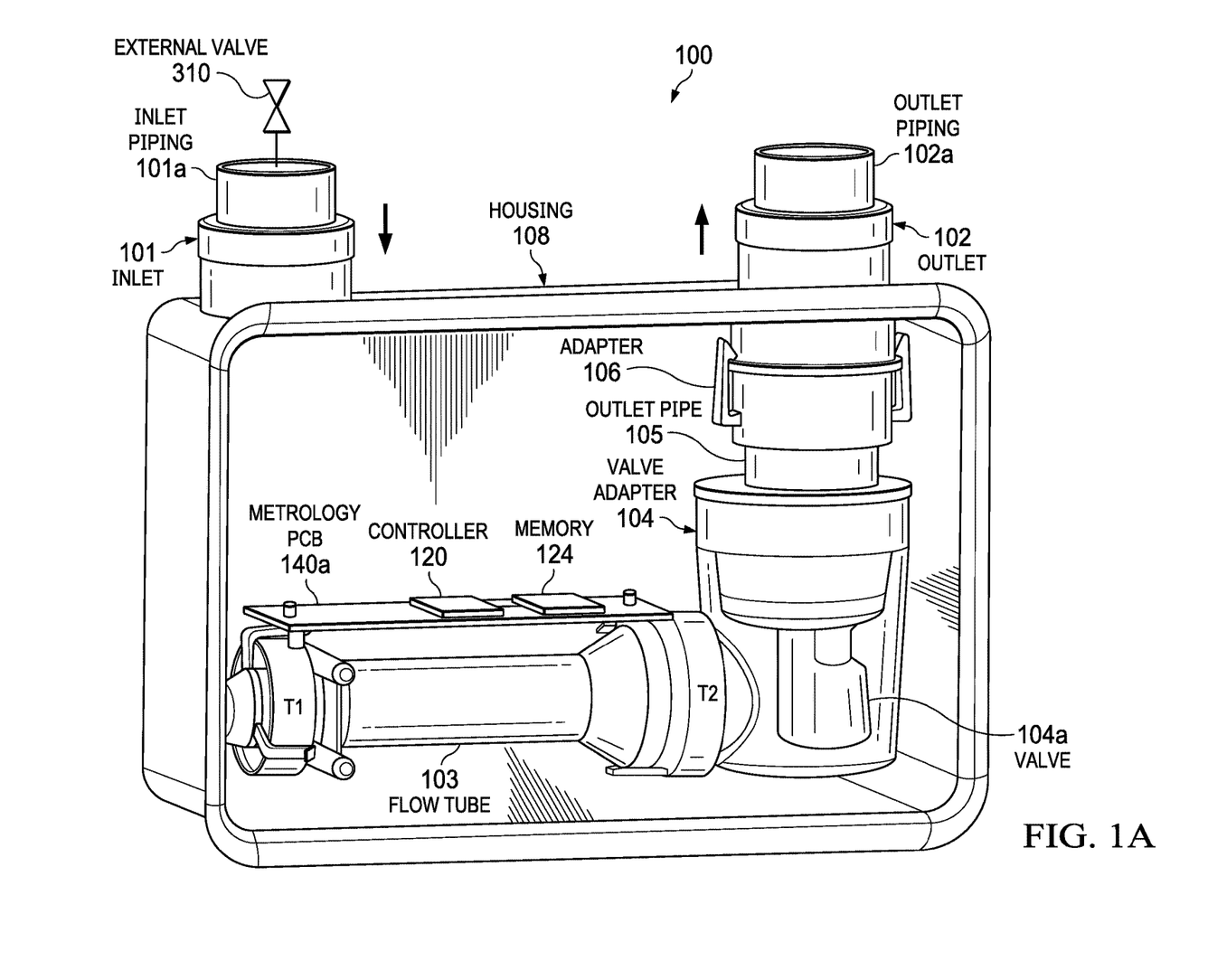
FIG. 1A shows components of an example static ultrasonic flowmeter shown by example as being an ultrasonic flowmeter with its housing cut open to reveal its internal features including its metrology printed circuit board (metrology PCB).

FIG. 1A shows components of an example ultrasonic flowmeter 100 shown by example as being an ultrasonic flowmeter with its housing 108 cut open to reveal its internal features including its metrology PCB 140a including a controller 120 such as a microcontroller (µC) having an associated memory 124 typically being flash memory, and its transducers on opposite ends of an integrated flow tube 103, with the transducers shown as $T_1$ and $T_2$ on respective ends of the flow tube 103. The housing 108 generally comprises a metal or a metal alloy.

Figure 1B:
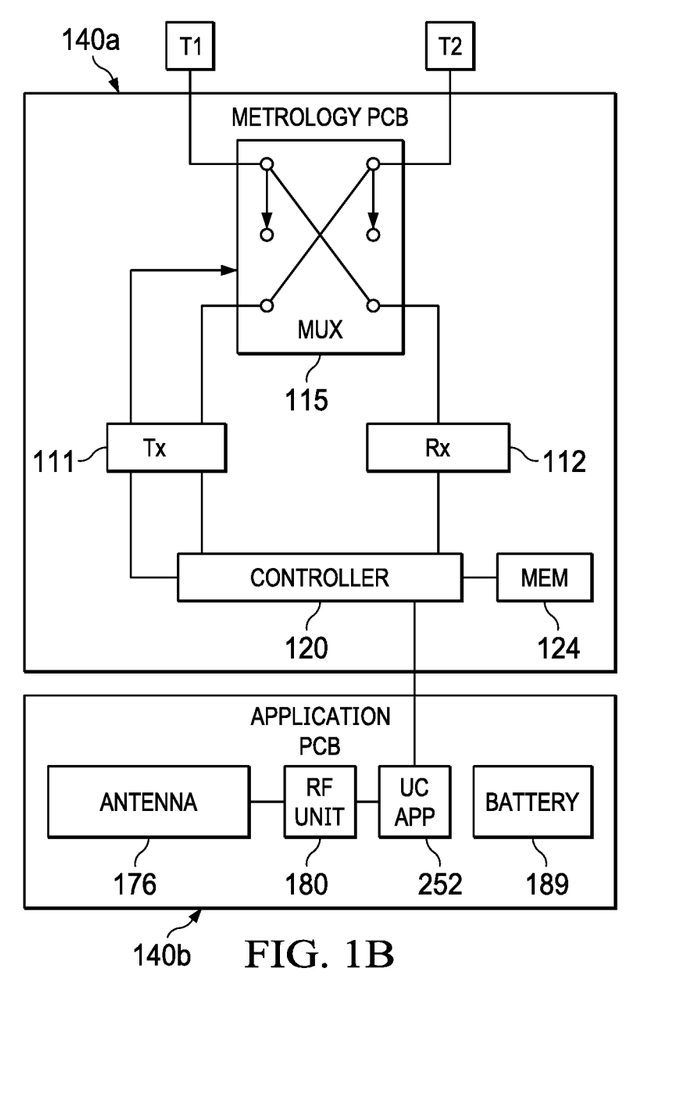
FIG. 1B shows some example components on metrology PCB shown in FIG. 1A, where the controller on the metrology PCB is communicatively coupled to an application PCB that includes an RF unit and an antenna.
Figure 2:
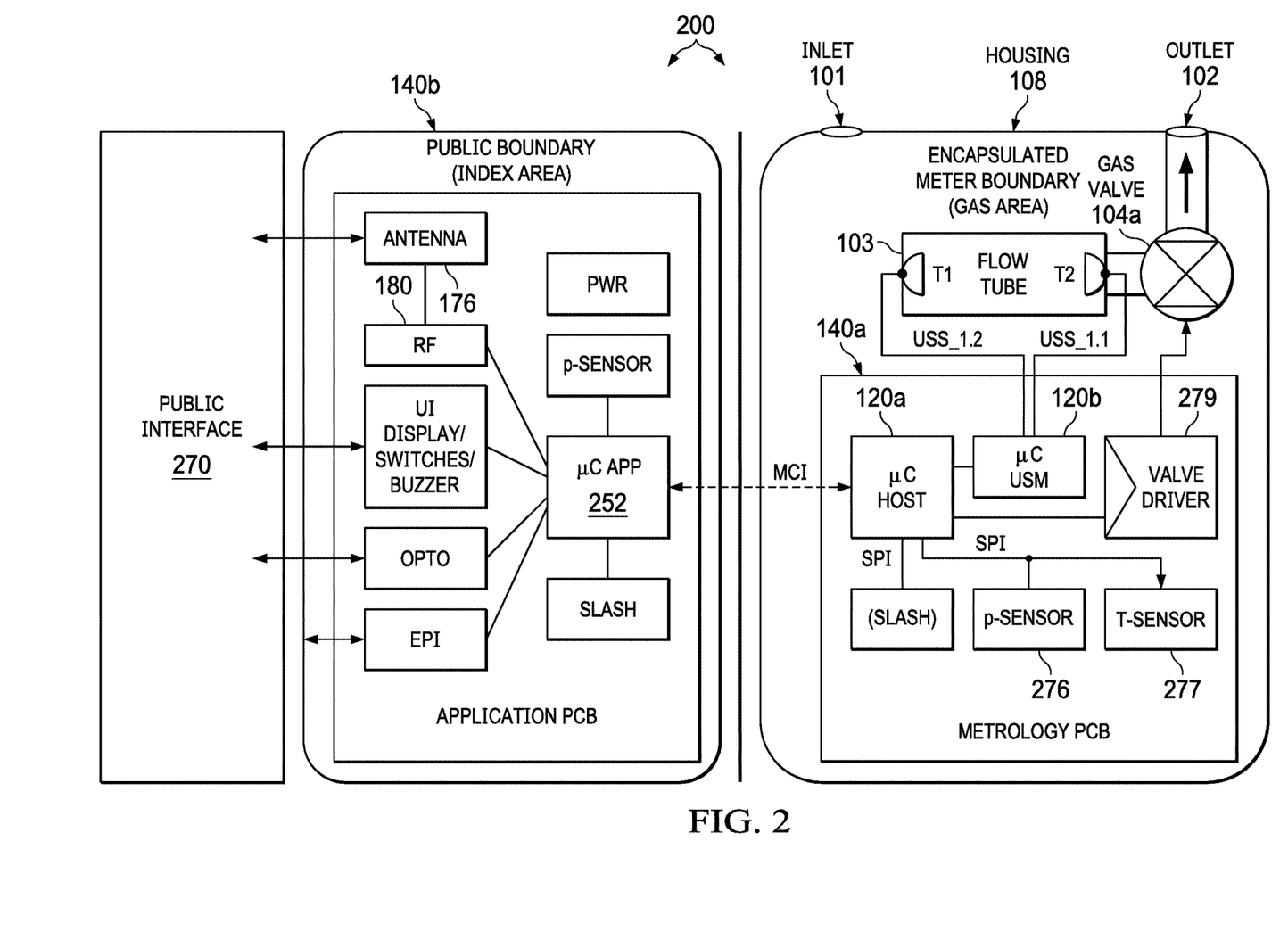
FIG. 2 shows an example architecture for a disclosed smart ultrasonic gas flowmeter, where the ultrasonic transducers shown as $T_1$ and $T_2$ are depicted as semicircles.

FIG. 1B shows some example components on metrology PCB 140a shown in FIG. 1A, where the controller 120, on the metrology PCB 140a shown coupled to an application PCB 140b. The application PCB 140b is shown in FIG. 1B including an application microcontroller is shown as an µC APP 252. There is also shown a battery 189, and an RF unit 180 including a transmitter and receiver that is coupled to an antenna 176. More details for an example application PCB 140b are shown in FIG. 2 described below.

Disclosed gas flowmeters such as the ultrasonic flowmeter 100 are generally low-power, low-cost, and comprise smart gas flowmeters (see the smart ultrasonic flowmeter 200 shown in FIG. 2 described below) that on their metrology PCB 140a include a controller 120, and a memory 124. As shown in FIG. 1B, the metrology PCB 140a includes a receiver (Rx) 112 and a transmitter (Tx) 111 shown coupled to $T_1$ and $T_2$ by an optional multiplexer (MUX) 115. One of the transducers transmits an ultrasonic signal and the other transducer receives the ultrasonic signal after passing through the fluid being measured. This transducer arrangement as known in the art can be switched using the MUX 115, so that $T_1$ and $T_2$ switch roles as transmitters and receivers. Configured as a smart gas flowmeter enables automated meter reading (AMR).

The integrated flow tube 103, having the transducers $T_1$ and $T_2$, is for measuring the gas flow rate through the flow tube 103. Inside the housing 108, there is an integrated in-line gas valve 104a, which can be connected to the inlet 101 or the outlet 102 to enable disconnecting the gas supply from flowing through the ultrasonic flowmeter 100. The flow rate for the ultrasonic flowmeter 100 will be initially calibrated in the production factory for offset and slope to get near to 0% error in flow measurement. It is foreseen, that the ultrasonic flowmeter 100 will have an error drift during its lifetime as ageing and dust effects may impact the flowmeter's gas flow measurement accuracy.

Many of the effects impacting the flowmeter's gas flow measurement accuracy are flow independent so that it is recognized possible to correct its overall accuracy if this offset can be corrected. Therefore, it is needed to have a specific known flow condition in the flowmeter and calibrate to this condition. The zero-flow condition is therefore recognized to be ideal, where there is no gas flow flowing through the gas flowmeter so that one can calculate the offset of the flowmeter relatively easily, which ideally should be 0. To obtain a zero-flow condition, disclosed aspects can use the integrated gas valve 104a which is generally available for conventional gas flowmeters. With a disclosed integrated gas valve 104a turned off, there is essentially no gas flow flowing through the flow tube of the gas flowmeter, and during this period the self-calibration of the gas flowmeter while remaining in the net may take place.

As known in the art, the ultrasonic transducer elements $T_1$ and $T_2$ generally comprise PZT and have a disc-shape, that being flat, thin circular objects. The ultrasonic flowmeter 100 may be attached to a pipe, generally either being inserted into the pipe using a gas tight and high-pressure resistant mechanism, or configured as a clamp-on device installed on the outside of the pipe. The ultrasonic transducers $T_1$ and $T_2$ are set into vibration when a pulsed voltage signal (receipt from a transmitter) is applied to their piezo-electric element(s), thereby generating ultrasonic waves.

As known in the art, the ultrasonic flowmeter 100 can include more than the 2 ultrasonic transducers $T_1$ and $T_2$ shown in FIG. 1A, typically from two up to 16 ultrasonic transducers. As shown in FIG. 1B, the metrology PCB 140a includes both a Tx 111 and a Rx 112, or as an alternative to the separate Tx 111 and Rx 112 as shown, there can be a single transceiver, coupled to $T_2$ and $T_1$ respectively by the MUX 115 that enables the ultrasonic transducers $T_2$ and $T_1$ to swap (alternate) transmit and receive roles so that in one moment Tx 111 is on, and the Rx 112 is on another moment.

The controller 120 can comprise a microcontroller unit (MCU), a microprocessor, or a digital signal processor (DSP). The memory 124 can store code for algorithms including a disclosed calibration algorithm and algorithm for implementing corrected flow measurements. However, as known in the art, algorithms run by the controller 120 may be implemented by hardware and/or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or complex programmable logic device (CPLD), or a dedicated application-specific integrated circuit (ASIC) to implement the logic gate pattern. Regarding software-based implementations, code for the algorithm is generally stored in a memory such as memory 124 that can be implemented by the controller 120.

The controller 120 generally includes a low-power (also called sleep) mode, to save power of the battery 189, where the controller 120 generally keeps running even when it goes into the low-power mode. The ultrasonic flowmeter 100 includes inlet piping 101a coupled to the inlet 101, outlet piping 102a coupled to the outlet 102. The flow tube 103 has a sealed connection to the outlet 102, with the sealed connection comprising a valve adapter 104 including an integrated gas valve 104a, then an outlet pipe 105 that is directly coupled to the outlet 102 by an adapter 106. Also shown in FIG. 1A is an optional external valve 310 coupled to the inlet piping 101a. Although $T_1$ and $T_2$ are shown being in a straight transducer arrangement, the transducers can be configured in other arrangements such as a V-arrangement. Moreover, as noted above, there can be more than two transducers.

FIG. 2 shows an example architecture for a disclosed smart gas flowmeter 200 where $T_1$ and $T_2$ are depicted as semicircles. The left ultrasonic transducer shown as $T_1$ is at the inlet 101 of the flow tube 103 and the right ultrasonic transducer shown as $T_2$ is at the outlet 102 of the flow tube 103 which is connected to the integrated gas valve 104a. There are two PCBs shown, including a metrology PCB 140a for calculation of the gas flow rate and control of the integrated gas valve 104a through the valve driver 279. The application PCB 140b includes an µC APP 252 and a communication module shown including RF communications unit 180 coupled to an antenna 176 to enable communications with the public interface 270 shown.

The metrology PCB 140a for its controller is shown including a first controller comprising a microcontroller shown as being a µC host 120a, and a second controller comprising another microcontroller shown as being a µC USM 120b, where USM stands for ultrasonic measurement. There is also a valve driver 279 shown coupled to drive the integrated gas valve 104a, and a pressure sensor 276, as well as a temperature sensor 277. The metrology communication interface (MCI) connection shown between the metrology PCB 140a and the application PCB 140b is the interface between the µC APP 252 and the µC host 120a.

Figure 3:
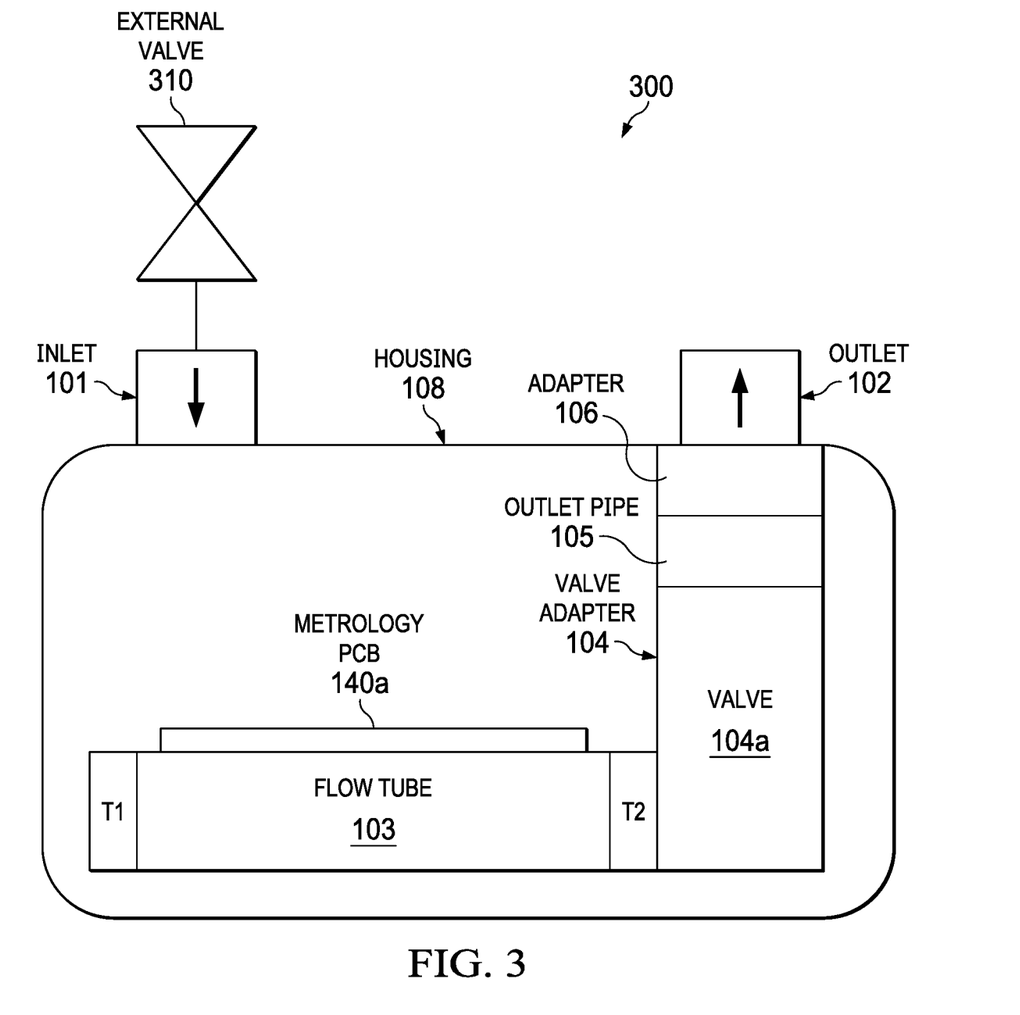
FIG. 3 shows a depiction of an example gas flowmeter shown with its inlet coupled to an external valve that can comprise a ball valve.

FIG. 3 shows a depiction of an example gas flowmeter 300 shown with its inlet 101 coupled to an external valve 310 that can be a ball valve. Although in this arrangement there is an integrated gas valve 104a positioned on the outlet side of the flow tube 103, in some disclosed arrangements the external valve 310 can be the only valve used to provide a zero-flow condition to implement disclosed in-line calibration. FIG. 3 shows the gas flowmeter 300 having a ball valve 310 coupled to the inlet 101 for further improvement of the self-calibration conditions positioned upstream of the gas flowmeter 300.

The ball valve 310 can be closed at essentially the same time the integrated gas valve 104a is closed. The ball valve 310 is designed for a low gas leakage rate when the inlet 101 and the outlet 102 of the gas flowmeter 300 are closed to create ideal conditions for essentially zero-flow, to enable initiating an accurate self-calibration of the gas flowmeter 300. This in-line calibration can be performed several times during the lifetime of the gas flowmeter automatically by the gas flowmeter itself, or manually by service personnel on site.

Figure 4:
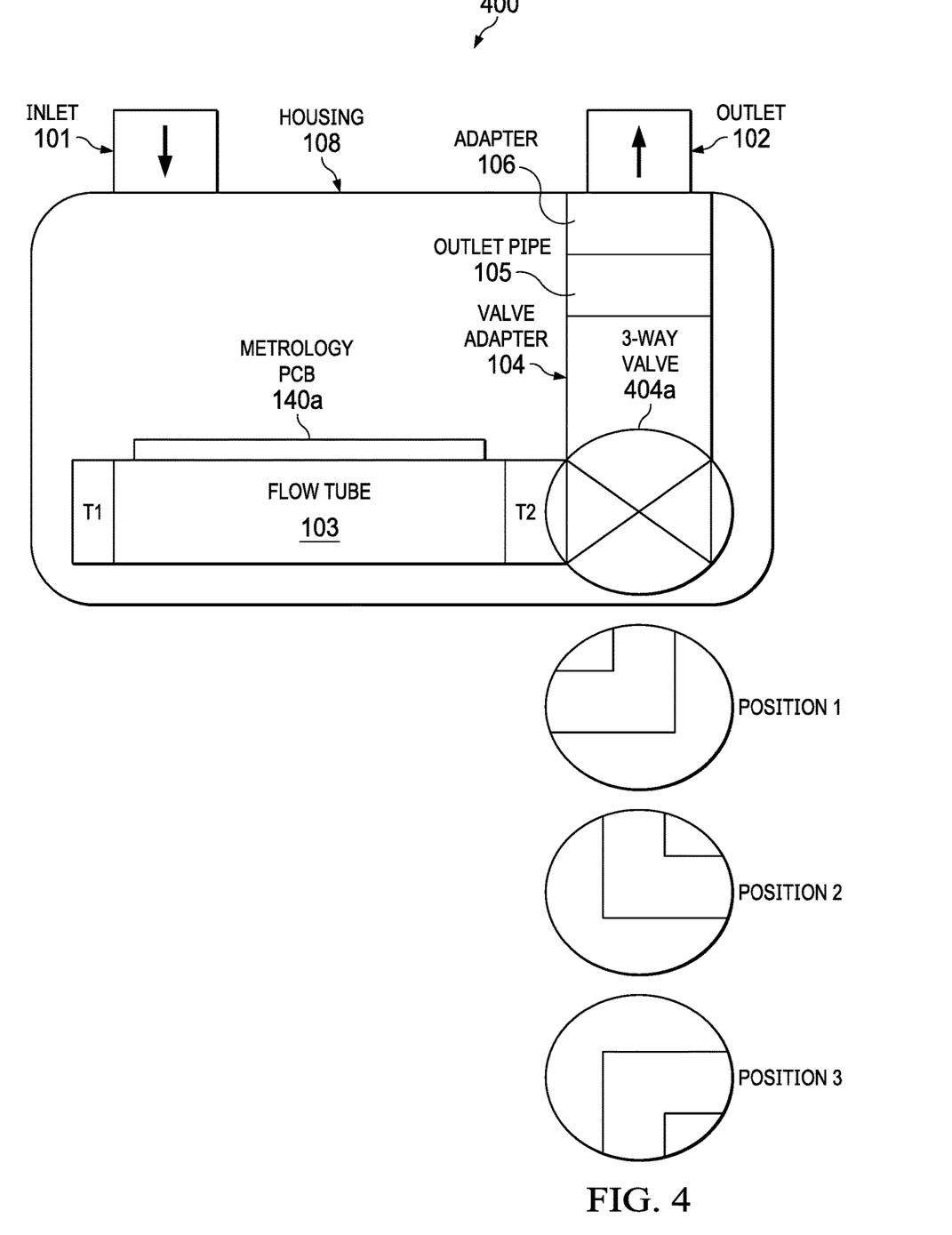
FIG. 4 is a depiction of an example gas flowmeter that includes an integrated three-way valve for the gas flowmeter's integrated in-line gas valve, showing its three different possible positions being open, bypass, and closed.
Figure 5:
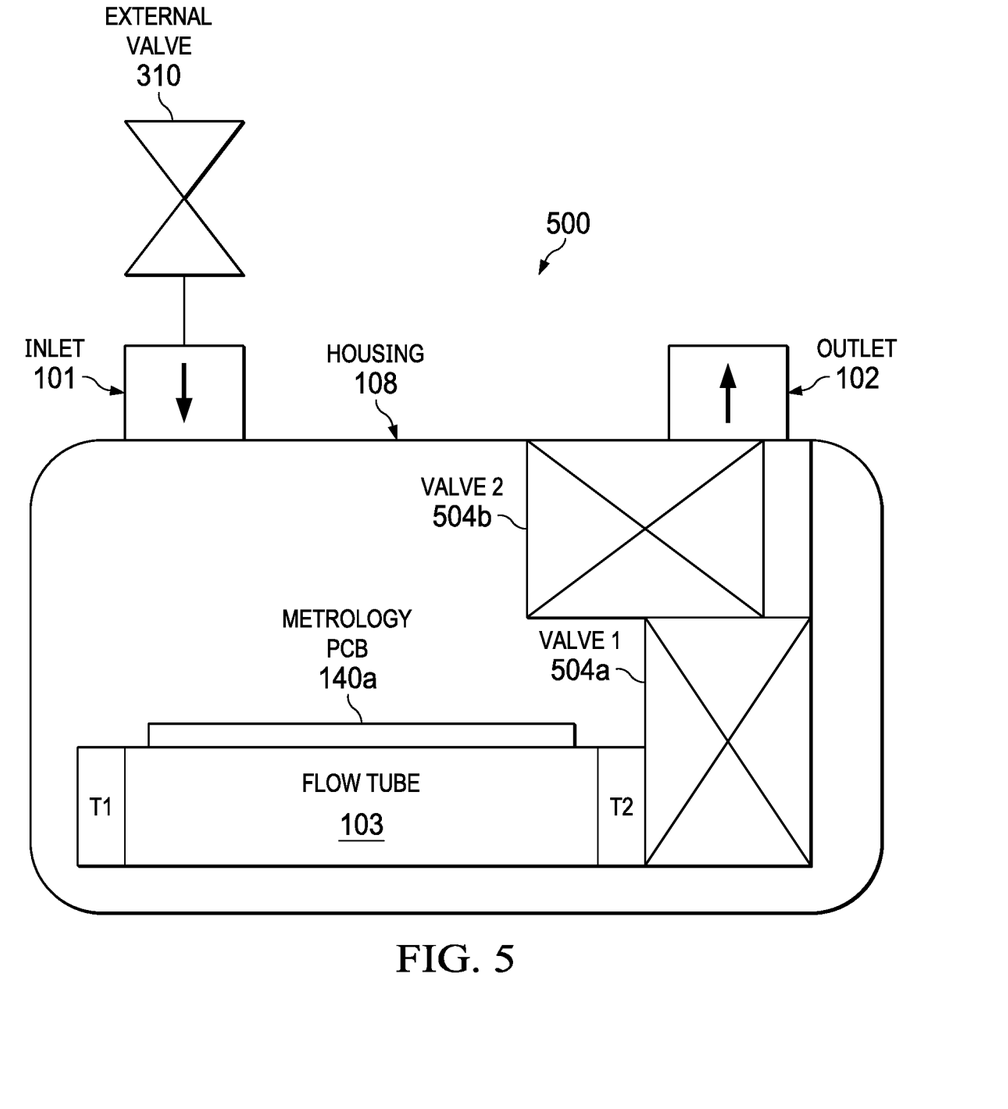
FIG. 5 is a depiction of an example gas flowmeter that includes an integrated in-line gas valve that comprises a first and a second 2-way valve that is both coupled to the outlet, where the 2-way valves can alternatively also be connected to the inlet.

Disclosed aspects also include a gas flowmeter that includes at least one 3-way valve which provides three-state operation (open, closed, and bypass) as shown in FIG. 4 as gas flowmeter 400 or 2 2-way valves as shown in FIG. 5 as gas flowmeter 500. Both of these three-state arrangements are also for disclosed self-calibration of the gas flowmeter while remaining installed in the net. As with the other disclosed embodiments the gas flowmeter has an integrated flow tube 103 with transducers to enable measuring the flow rate through the gas flowmeter.

Inside the gas flowmeter there is at least one integrated 3-way valve, or first and second separate 2-way valves, which can be connected to the inlet or to the outlet of the flowmeter configured to disconnect the gas supply to the flowmeter to enable calibration in the field of the gas flowmeter. As with the other embodiments described above the gas flowmeter flow rate will be initially calibrated in the production factory for offset and slope to provide nearly a 0% error in gas flow measurements. However, it is foreseen, that the gas flowmeter will have an error drift during his lifetime as ageing and dust effects can impact the measurement accuracy of the gas flowmeter.

The gas flowmeter 400 shown in FIG. 4 includes an integrated three-way valve 404a for the gas flowmeter's integrated in-line gas valve, showing its three different possible positions being open, bypass, and closed. Although the three-way valve 404a is shown being coupled to the outlet 102, it can also be connected to the inlet 101 of the gas flowmeter 400. The 3-way valve 404a shown in gas flowmeter 400 provides the positions "open", "closed" and "bypass", while as described above the 2 2-way valves shown the gas flowmeter 500 shown in FIG. 5 together can provide these same three positions, with 1 2-way valve providing the open and closed state, and the other 2-way valve providing the bypassed state. Within a closed or bypassed position of the valve, there is no gas flow inside the flow tube 103, and during this period of time the self-calibration while remaining in the net may take place. The "bypass" position has an advantage that the end user gas supply (such as a homeowner or a business) is not disconnected so that no service technician is required to release the valve after the calibration of the gas flowmeter is finished. As described above, this calibration can be done several times during the lifetime of the flowmeter automatically by the gas flowmeter itself.

The gas flowmeter 500 shown in FIG. 5 includes an integrated in-line gas valve that comprises a first and a second 2-way valve shown as valve 1 504a and valve 2 504b that are both coupled to the outlet 102. These 2-way valves 504a and 504b can also be connected to the inlet 101. This arrangement provides the same function as one three-way valve shown for the gas flowmeter 400 shown in FIG. 4. With the 2 2-way valves 504a and 504b hooked up in series, there can be cost savings as compared to a single three-way valve.

Disclosed aspects can eliminate the requirement for a spot check for production batches of gas flowmeters while in the net, as the gas flowmeters can re-calibrate themselves at selected times during their lifetime while in the net, and are therefore made more reliable to being maintained within predetermined gas flow rate accuracy limits. This is a significant benefit for flowmeter operator companies, such as those companies selling natural gas to customers. The flowmeter production costs are unchanged when implementing disclosed aspects, as everything that is generally needed for disclosed self-calibration is already part of the gas flowmeter. Disclosed in-line self-calibration can be performed automatically and entirely using embedded gas flowmeter calibration software stored in the memory associated with the controller.

As noted above, when the integrated in-line gas valve is closed, no significant flow should be measurable through the gas flowmeter. During this period of time, the measuring interval for the gas flow measurement can be significantly extended or interrupted and energy (battery capacity when the flowmeter is battery-powered) can be saved. Only "leaky valve" detection should remain from time to time, such as once per hour. Diagnostics can remove the need for spot checks for gas flowmeter production batches while there are installed in the net, which is recognized to be an important topic for the introduction of smart gas flowmeters in markets including the US gas flowmeter market.

Disclosed aspects also include a method of calibrating gas flowmeters. The method comprises providing a gas flowmeter installed to sense a flow in a gas pipeline. The gas flowmeter is generally part of the gas infrastructure, and at the position where the gas flowmeter is installed, screw fittings can be used to connect the gas flowmeter. The gas flowmeter including an outer housing that includes an inlet, an outlet, a flow tube coupled to the outlet, and at least one flow sensor coupled to sense gas flow through the flow tube, a controller that is typically a microcontroller that includes an associated memory communicatively coupled to the sensor for receiving a sensing signal from the sensor, and for controlling operation of the sensor. For implementing a zero-flow condition at least one of i) the gas flowmeter further comprises an integrated gas valve connected to the inlet or to the outlet, and ii) an additional external valve is positioned outside the housing coupled to the inlet that provides at least two state operation.

Generally, before installing the gas flowmeter in or on a gas pipeline, generally in the production factory, there is a step of initially calibrating a flow rate of the gas flowmeter to correct for an offset and a constant slope to reduce an error (generally to provide nearly a 0% error) during its gas flow measurement. The disclosed in-line calibration comprises first creating a zero-flow condition. The controller, such as a microcontroller, can provide a control signal (such as using the valve driver 279 shown in FIG. 2) that results in the closing of the integrated gas valve 103 for providing the zero flow condition, and/or an external valve such as the external valve 310 shown in FIG. 1A and FIG. 3 is closed.

During this zero-flow condition, a flow measurement is made to provide a measured gas flow. From the measured gas flow, a flow offset is determined from measured gas flow which ideally should be zero. Optionally, it is also possible to measure a slope when the flow offset is measured in time measurement (over a period of time). If the flow offset is determined to be outside a predetermined limit, in-line calibrating can be implemented by utilizing the flow offset to target a zero-flow offset. The actual flow rate reported by the gas flowmeter can be implemented by a calculation of the measured flow rate multiplied by the flowmeter's constant slope, minus the flow offset.

A calibration process is now described using the three-way valve 404a of the gas flowmeter 400 shown in FIG. 4. An essentially zero-gas flow is first implemented in the measurement unit of the gas flowmeter 400 using one of the options described above regarding one or more valves. The flow offset is calculated when in the zero-flow condition enables generating a flow offset correction factor so that the measured flowrate by the flowmeter to be corrected including for the flow offset. The zero-flow offset is representative of the full flow range handled by the gas flowmeter. For the three-position valve, such as shown as three-way valve 404a associated with the gas flowmeter 400 shown in FIG. 4, position 1 is open, position 2 is zero flow in the measurement unit (meaning through the integrated flow tube 103) with a bypass for the gas flow so that the user can receive gas, and position 3 is no gas flow (a flow shut-off). A zero-flow drift correction can be accomplished while in valve position 2, or while in valve position 3.

A calibration process is now described using the 2 2-way valves 504a and 504b shown with the gas flowmeter 500 in FIG. 5. An essentially zero flow is first implemented in the measurement unit. The flow offset is calculated under the zero-flow condition, which enables generating a flow offset correction factor so that the measured flowrate of the flowmeter is corrected including for the flow offset. Zero flow offset is representative of the full flow range. Regarding the operation of the 2 2-way valves, one of the 2-way valves, such as valve 1 504a is for enabling or disabling the gas supply and the other valve such as valve 2 504b is for bypassing the flow for calibration. Zero flow drift correction is accomplished with valve 2 504b in the open position or valve 1 504a disabling the gas supply.

Both of these 2-way valves can be connected to the inlet side or to the outlet side in series. With these two 2-way valves 504a, 504b it is also possible to bypass the flow rate through the flow tube 103. During the bypass mode, the flow rate will not be measured, but as the self-calibration can be generally performed within a minute or less, the time period where the gas flow is not measured and counted up is generally acceptably low for the gas company.

Examples

Disclosed embodiments are further illustrated by the following specific Examples, which should not be construed as limiting the scope or content of this Disclosure in any way.

Figure 6A:
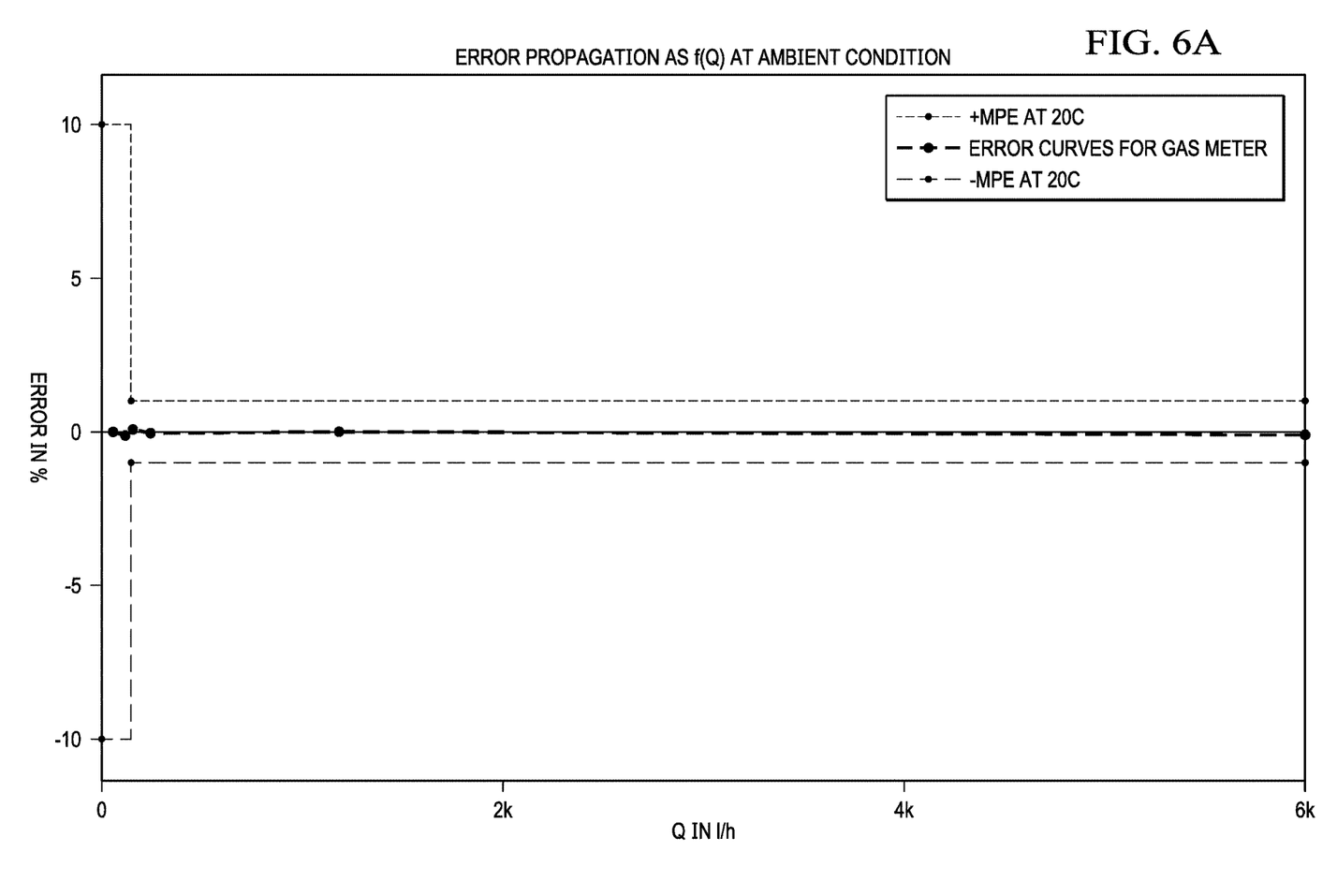
FIG. 6A shows results after gas flowmeter production calibration perform in the production factory.
Figure 6B:
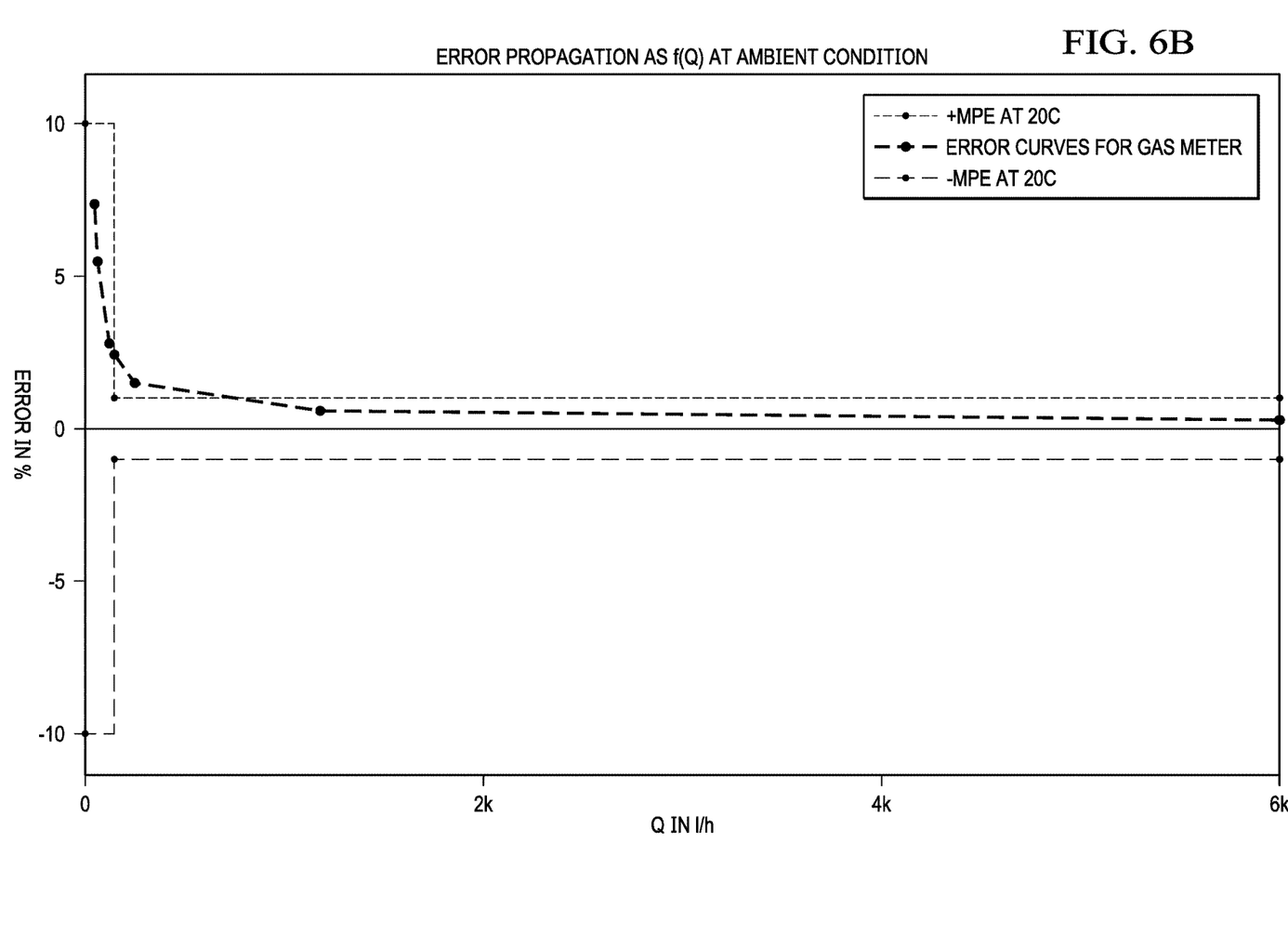
FIG. 6B shows results after the gas flowmeter is aged for several years in field use or after dust penetration.
Figure 6C:
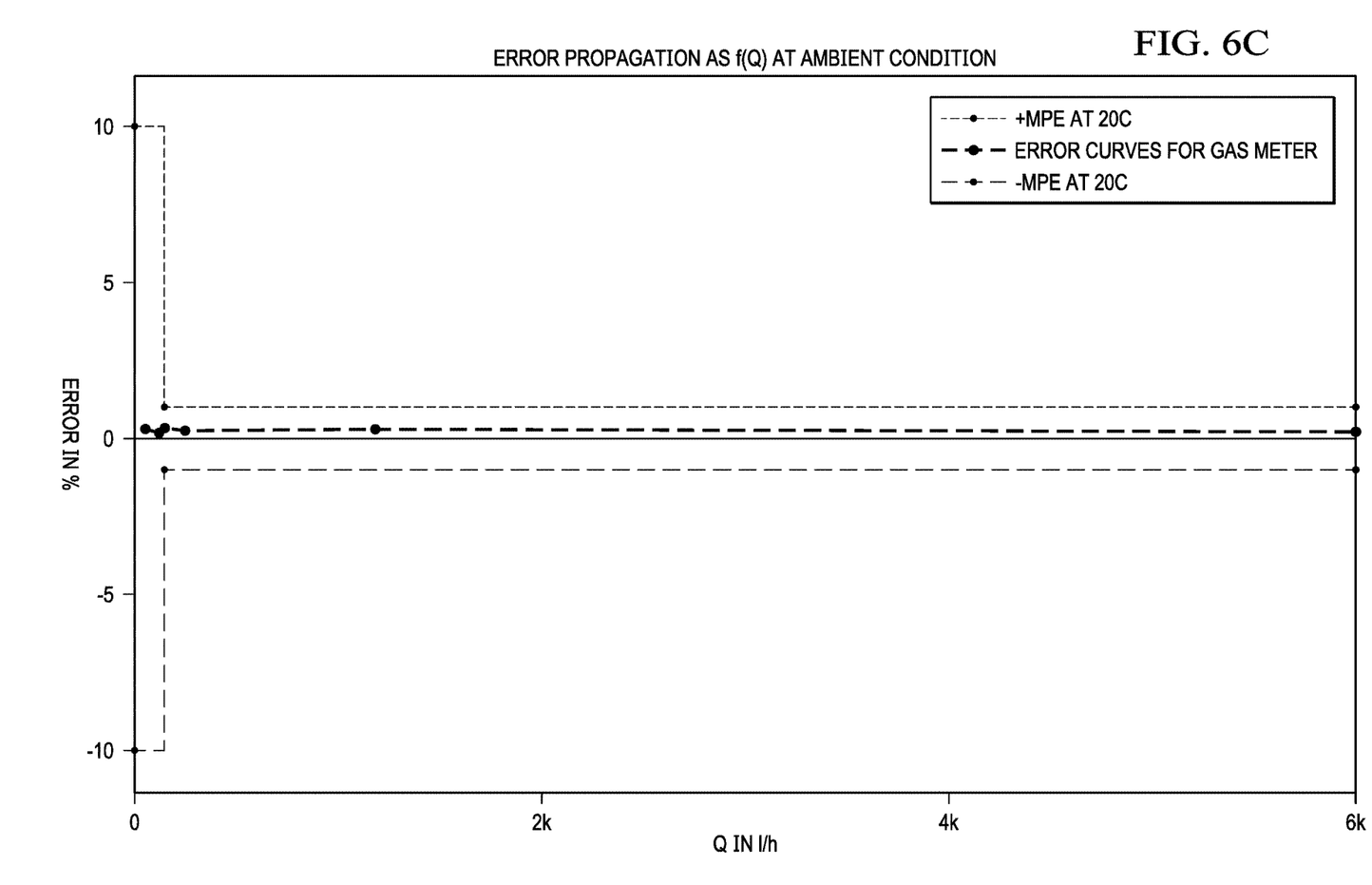
FIG. 6C shows results after disclosed in-line (in the field) self-calibration was successfully performed on the gas flowmeter.

FIGS. 6A-C are simulated plots showing the gas flow rate error for an ultrasonic gas flowmeter based on the ultrasonic flowmeter 100 shown in FIG. 1A described above in percentage flow error (y-axis) versus the gas flow rate, with the testing performed at ambient conditions. FIG. 6B as described below functions as a control because the gas flowmeter data did not benefit from disclosed in-line (in the field) self-calibration. The units for the gas flow rate shown as Q is liters (1) per hour (h). The dotted lines shown in these FIGs are examples of allowed flow rate accuracy limits shown as maximum permissible error abbreviated as 'MPE' at 20° C. that are used to define error bounds with reference to error curves for the gas flowmeter data also shown.

FIG. 6A shows results after gas flowmeter production calibration perform in the factory. FIG. 6B shows results after the gas flowmeter is aged for several years in field use or after dust penetration, where field use and dust penetration show essentially the same resulting inaccurate gas flow measurement result. FIG. 6C shows results after disclosed in-line (in the field) self-calibration was successfully performed on the gas flowmeter before collecting the gas flowmeter data shown. Comparing results shown in FIG. 6C to the results shown in FIG. 6B, one can see a significant improvement in measured gas flow rate accuracy for the gas flowmeter provided by disclosed in-line flow rate calibration, particularly for the low flow rates.

The following example TOF-based formula shown below can be used to calculate the corrected gas flowrate shown as Q, which clarifies the use of the correction factors for the constant slope correction shown as $C_{slope}$, and for the flow offset correction shown as $C_{Offset}$. The above-described method determines Comet while the gas flowmeter is connected to the net, while $C_{slope}$ is generally determined for the gas flowmeter while it is in its production factory, where these correction factors can be inserted in the equation below for Q to calculate Q.

$$Q = C_{Slope} \frac{T_{21} - T_{12}}{T_{12}T_{21}} + C_{Offset}$$

where:
Q—corrected gas flowrate
$T_{12}$—Absolute Time of Flight from $T_1$ to $T_2$
$T_{21}$—Absolute Time of Flight from $T_2$ to $T_1$
$C_{Slope}$—the correction factor for the slope
$C_{Offset}$—the correction factor for the flow offset While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
providing a static gas flowmeter installed to sense a flow of a gas in a pipe section of a gas pipeline, the gas flowmeter including an outer housing that includes an inlet, an outlet, a flow tube coupled to the outlet or the inlet, and at least one flow sensor positioned for sensing the gas flowing through the flow tube, a controller including an associated memory communicatively coupled to the sensor for receiving a sensing signal from the sensor, and for controlling operation of the sensor;
wherein at least one of i) the gas flowmeter further comprises an integrated gas valve connected to the inlet or to the outlet, and ii) an external valve positioned outside the housing coupled to the inlet that provides at least two state operation;
creating a zero-flow condition using at least one of closing or bypassing the integrated gas valve or manually closing the external valve;
during the zero-flow condition measuring a measured gas flow;
determining a flow offset correction factor, from the measured gas flow, and
determining that the flow offset correction factor is different than a predetermined limit, and then calibrating in-line, using flow calibration hardware or software, by adding the flow offset correction factor to the flow measurement algorithm.

2. The method of claim 1, wherein a corrected flow rate output by the gas flowmeter after the in-line calibrating is calculated by the flow measurement algorithm as a measured flow rate of the gas multiplied by a constant slope for the gas flowmeter adjusted by the flow offset correction factor.

3. The method of claim 2, further comprising before installing the gas flowmeter in the gas pipeline off-line calibrating of the gas flowmeter comprising determining the constant slope correction factor.

4. The method of claim 1, wherein the in-line calibrating is exclusively run automatically by the gas flowmeter, and wherein the method further comprises the controller providing a control signal for the integrated gas valve to close for providing the zero-flow condition.

5. The method of claim 1, wherein the flow sensor includes a first ultrasonic transducer and at least a second ultrasonic transducer, and wherein the gas flowmeter comprises an ultrasonic flowmeter.

6. The method of claim 1, wherein the creating the zero-flow condition comprises closing the external valve.

7. The method of claim 1, wherein the integrated gas valve comprises at least one valve arrangement that provides an open position, a closed position where the gas flowmeter will not count gas flow and a downstream installation will not receive the gas, and a bypass position where the gas flowmeter will not count the gas flow and the downstream installation will receive the gas, and wherein the determining of the flow offset correction factor is performable while the valve arrangement is in the closed position or in the bypass position.

8. The method of claim 7, wherein the valve arrangement comprises a three-way valve, or wherein the valve arrangement comprises a first and a second 2-way valve.

9. The method of claim 1, wherein the gas flowmeter further comprises a radio frequency (RF) communications unit including a transmitter and receiver coupled to an antenna and coupled to the controller, and a battery for powering the gas flowmeter, where the controller includes a low-power mode, the method further comprising automatically generating an alarm and sending a wireless signal using the RF communications unit when the correction factor is determined to be greater than a predetermined limit for the correction factor.

10. A static gas flowmeter, comprising:
an outer housing that includes an inlet, an outlet, a flow tube coupled to the outlet or to the inlet, an integrated gas valve connected to the inlet or to the outlet that provides at least two state operation and at least one sensor positioned for sensing a gas flowing through the flow tube, a controller including an associated memory including a flow calibration algorithm and a flow measurement algorithm communicatively coupled to the sensor for receiving a sensing signal from the sensor, and for controlling operation of the sensor;

wherein the flowmeter is configured for being installed to sense a flow of a gas in a pipe section of a gas pipeline, and the flow calibration algorithm is configured for closing the integrated gas valve to create a zero-flow condition, wherein the controller provides a signal to the integrated gas valve to close for providing the zero-flow condition;

during the zero-flow condition, the flow measurement algorithm is configured for measuring a measured gas flow;

from the measured gas flow, the flow calibration algorithm:

determining a flow offset correction factor, and if the flow offset correction factor is determined to be different than a predetermined limit, in-line calibrating by adding the flow offset correction factor to the flow measurement algorithm.

11. The gas flowmeter of claim 10, wherein a corrected flow rate output by the gas flowmeter after the in-line calibrating is calculated as a measured flow rate of the gas multiplied by a constant slope correction factor for the gas flowmeter adjusted by the flow offset correction factor.

12. The static gas flowmeter of claim 10, wherein the sensor comprises a first ultrasonic transducer and at least a second ultrasonic transducer, and wherein the gas flowmeter comprises an ultrasonic flowmeter.

13. The gas flowmeter of claim 10, wherein the integrated gas valve comprises at least one valve arrangement that provides an open, a closed position where the gas flowmeter will not count gas and the installed flowmeter will not receive the gas, and a bypass position where the gas flowmeter will not count the gas and the installed flowmeter will receive the gas, and wherein the determining of the flow offset correction factor is performable while the valve arrangement is in the closed position or in the bypass position.

14. The gas flowmeter of claim 13, wherein the valve arrangement comprises a three-way valve, or wherein the valve arrangement comprises a first and a second 2-way valve.

15. A system comprising:

a gas flowmeter configured for being installed to sense a flow of a gas in a pipe section of a gas pipeline including an outer housing, an inlet and an output, an flow tube coupled to the outlet or to the inlet, with inlet piping coupled to the inlet, and outlet piping coupled to an outlet, and at least one sensor positioned for sensing the gas flowing through the flow tube, a controller including an associated memory communicatively coupled to receive a sensing signal from the sensor, and for controlling operation of the sensor;

wherein at least one of the gas flowmeter further comprises an integrated gas valve connected to the inlet or to the outlet, and an external valve positioned in-line outside the housing coupled to the inlet piping, to provide at least two position operation;

wherein the memory includes flow measurement software, and flow calibration hardware or software run by the controller;

wherein the flow calibration hardware or software is configured to create a zero-flow condition by at least one of closing or bypassing the integrated gas valve or manually closing the external valve, and the flow measurement software is configured to measure a measured gas flow during the zero-flow condition;

from the measured gas flow, the flow calibration hardware or software is further configured to:

determine a flow offset correction factor;

determine if the flow offset correction factor is different than a predetermined limit, and if the flow offset correction factor is determined to be different than a predetermined limit, in-line calibrate by adding the flow offset correction factor to the flow measurement algorithm.

16. The system of claim 15, wherein the gas flowmeter includes the integrated gas valve, wherein the in-line calibrating is exclusively run automatically by the gas flowmeter, and wherein the method further comprises the controller providing a control signal for the integrated gas valve to close for providing the zero-flow condition.

17. The system of claim 15, wherein the sensor comprises a first and a second ultrasonic sensor, and wherein the gas flowmeter comprises an ultrasonic flowmeter.

18. The system of claim 15, wherein the integrated gas valve comprises at least one valve arrangement that provides an open position, a closed position where the gas flowmeter will not count gas flow and a downstream installation will not receive the gas, and a bypass position where the gas flowmeter will not count the gas flow and the downstream installation will receive the gas, and wherein the determining of the flow offset correction factor is performable while the valve arrangement is in the closed position or in the bypass position.

19. The system of claim 18, wherein the valve arrangement comprises a three-way valve or a first and a second 2-way valve.

20. The system of claim 15, wherein the gas flowmeter further comprises a radio frequency (RF) communications unit including a transmitter and receiver coupled to an antenna and coupled to the controller, and a battery for powering the gas flowmeter, wherein the controller includes a low-power mode.

* * * * *